United States Patent [19]
Friesen et al.

[11] Patent Number: 5,113,956
[45] Date of Patent: May 19, 1992

[54] FORWARDLY FOLDING TOOL BAR

[76] Inventors: Milford E. Friesen, Box 174, Litchfield, Nebr. 68852; Arlyn E. Friesen, Box 548, Loup City, Nebr. 68853

[21] Appl. No.: 644,944

[22] Filed: Jan. 23, 1991

[51] Int. Cl.$^5$ .......................................... A01B 63/102
[52] U.S. Cl. ................... 172/311; 172/456; 172/466; 280/491.2
[58] Field of Search ............... 172/311, 456, 466, 677; 111/53, 57, 56; 403/109; 210/491.2, 656; 56/14.7, DIG. 14; 414/718

[56] References Cited

U.S. PATENT DOCUMENTS

| | | | |
|---|---|---|---|
| 3,635,495 | 1/1972 | Orendorff | 172/625 |
| 3,791,673 | 2/1974 | Hornung | 172/456 |
| 4,137,852 | 2/1979 | Pratt | 172/311 |
| 4,171,022 | 10/1979 | Applequist | 172/456 |
| 4,319,643 | 3/1982 | Carter et al. | 172/311 |
| 4,504,076 | 3/1985 | Bedney | 172/311 |
| 4,582,143 | 4/1986 | Pratt | 172/311 |
| 4,596,290 | 6/1986 | Bedney | 172/677 |
| 4,664,202 | 5/1987 | Applequist et al. | 172/456 |
| 4,721,167 | 1/1988 | Salley et al. | 172/311 |
| 4,721,168 | 1/1988 | Kihzenbaw | 172/311 |
| 4,723,787 | 2/1988 | Hadley et al. | 172/456 |
| 4,945,997 | 8/1990 | Adee | 172/456 |
| 4,974,684 | 12/1990 | Stevens | 172/481 |

FOREIGN PATENT DOCUMENTS

| | | | |
|---|---|---|---|
| 155689 | 9/1985 | European Pat. Off. | 172/311 |
| 2586623 | 3/1987 | France | 280/491.2 |

OTHER PUBLICATIONS

Kinze Brochure, "Multi-row Mobility", Rear Folding Planter Bar, 1983, pp. 1–4.
Great Plains Brochure, "Solid Stand 3-Section Folding Drill," 1986, pp. 1–4.
Tillage and Earthmoving Equipment Catalog, Jan. 1991, Brillion "WL Pulvi-Mulcher" advertisement, pp. 41–42.
Shoup Manufacturing Company brochure, "Front Folding Planter Frams," (no date) pp. 1–4.
Great Pains Advertisment, "Solid Stand Folding Drills," p. 12 (no date).
Great Plains Advertisement, "Folding No-Til Drills," p. 15 (no date).
Great Plains Advertisement, "Multi-Flex Planter", p. 18 (no date).
Tillage and Earthmoving Equipment Catalog, Jan. 1991, "Orthman 12-50 16-Row RTC" Advertisement, p. 50.
Brillion Iron Works, p. 42, Brillion Pulverizers.
Shoup Manufacturing Company, Shoup Front Folding Planter.
Great Plains, p. 12.
Great Plains, p. 15.
Great Plains, p. 18.
Agri-Products Mulcher, p. 50.

Primary Examiner—Dennis L. Taylor
Assistant Examiner—Spencer Warnick
Attorney, Agent, or Firm—Zarley, McKee, Thomte, Voorhees & Sease

[57] ABSTRACT

A forwardly folding tool bar comprising a center tool bar section having wing sections pivotally secured to the outer ends thereof. Hydraulic cyclinders are operatively connected to the wing sections to cause the wing sections to be forwardly folded relative to the center tool bar section. The wing sections are supported on a transversely extending beam secured to the tongue when the folding tool bar is in its transport position. The tool bar inlcudes a telescoping tongue which may be locked in its withdrawn position without leaving the tractor. The tool bar sections are supported by gauge wheels which are mounted at the forward side of the tool bar sections so that they do not interfere with the mount of implements on the tool bar sections.

7 Claims, 9 Drawing Sheets

FORWARDLY FOLDING TOOL BAR

BACKGROUND OF THE INVENTION

This invention relates to a folding tool bar and more particularly to a forwardly folding tool bar.

Tool bars are commonly used in farming operations. The conventional tool bars normally consist of a transversely extending tool bar or frame member having a hitch secured thereto which extends forwardly therefrom for attachment to a prime mover. Attachments such as cultivators, planter units, stalk cutters, etc. are mounted on the tool bar to perform various farming operations. A major problem associated with conventional tool bars is that the working or field width thereof must be substantially reduced to enable the implement to be transported from one location to another. Many types of tool bars employ a center tool bar section having wing tool bar sections extending outwardly therefrom. In certain of the prior art tool bars, the wings are pivoted from a substantially horizontal working field position to an upright transport position. In most folding tool bars of this type, the upright position of the wings is not as stable as desired and may create undesirable stress on certain components of the tool bar.

A further problem associated with the conventional folding tool bars is that they are not sufficiently flexible to compensate for irregular terrain such as in hill country, terraces, etc. Yet another disadvantage of the prior art devices is that the wheels which support the tool bar interfere with the mounting of various attachments on the tool bar due to the location of the wheels on the tool bar. Still another disadvantage of the conventional prior art tool bars is that they are difficult to move from the field position to the transport position and vice versa.

It is therefore a principal object of the invention to provide an improved folding tool bar.

Still another object of the invention is to provide a forwardly folding tool bar.

Still another object of the invention is to provide a forwardly folding tool bar including an extendable hitch.

Still another object of the invention is to provide a folding tool bar wherein the wheels which support the tool bar are mounted thereon in such a position so as not to interfere with the mounting of attachments thereon.

Still another object of the invention is to provide a folding tool bar which has sufficient flexibility to enable the tool bar to be used in hilly country or on terraces.

Still another object of the invention is to provide a forwardly folding tool bar which is quickly and easily moved from a working field position to a transport position and vice versa.

Yet another object of the invention is to provide a forwardly folding tool bar which is economical of manufacture and durable in use.

These and other objects of the present invention will be apparent to those skilled in the art.

SUMMARY OF THE INVENTION

A forwardly folding tool bar is described which includes a center tool bar section which is disposed transversely to the direction of travel of the tool bar and which has opposite ends. Wing tool bar sections are pivotally secured, about vertical and horizontal axes, to the outer ends of the center tool bar section. In the field position, the wing tool bar sections are aligned in an end-to-end fashion with the center tool bar section. A plurality of wheels are mounted on the center tool bar section and the wing tool bar section and are positioned forwardly of the tool bar so that the wheels do not interfere with mounting of attachments to the tool bar section. An extendable or telescoping tongue is secured to the center tool bar section and extends forwardly therefrom for attachment to a prime mover. When the folding tool bar is in its working field condition, the telescoping tongue is in its retracted position. Hydraulic cylinders are operatively connected to the wing tool bar sections and are used to cause the wing tool bar sections to be pivotally moved forwardly relative to the center tool bar section when it is desired to move the tool bar to a transport position. As the wing tool bar sections are moved forwardly by the hydraulic cylinders, the telescoping tongue is extended and pushes the tractor forwardly so that the wing tool bar sections may be positioned rearwardly thereof. The wing tool bar sections are operatively secured to the telescoping tongue, when in the transport position, and the wheels supporting the wing tool bar sections are then raised out of ground engagement. Means is also provided for locking the telescoping tongue in its retracted position.

DESCRIPTION OF THE PREFERRED EMBODIMENT

The numeral 10 refers to the forwardly folding tool bar of this invention. Tool bar 10 includes a telescoping tongue 12 comprised of tubular tongue sections 14, 16, 18, 20 and 22. Preferably, tongue sections 14 and 22 are comprised of steel and are eight inches by 10 inches. Tongue sections 16 and 18 are also preferably constructed of steel and are seven inches by nine inches. Tongue section 20 is also preferably constructed of steel and has a dimension of six inches by eight inches. It is preferred that all of the tongue sections have a wall thickness of ⅜ inch.

Tongue section 16 is slidably mounted within tongue section 14 and tongue section 18 is slidably mounted in tongue sections 16 and 20. Tongue section 20 is slidably mounted in tongue section 22. Tongue lift assembly 26 is pivotally connected to tongue section 14 for raising and lowering the forward end of tongue section 14.

Figure 13:
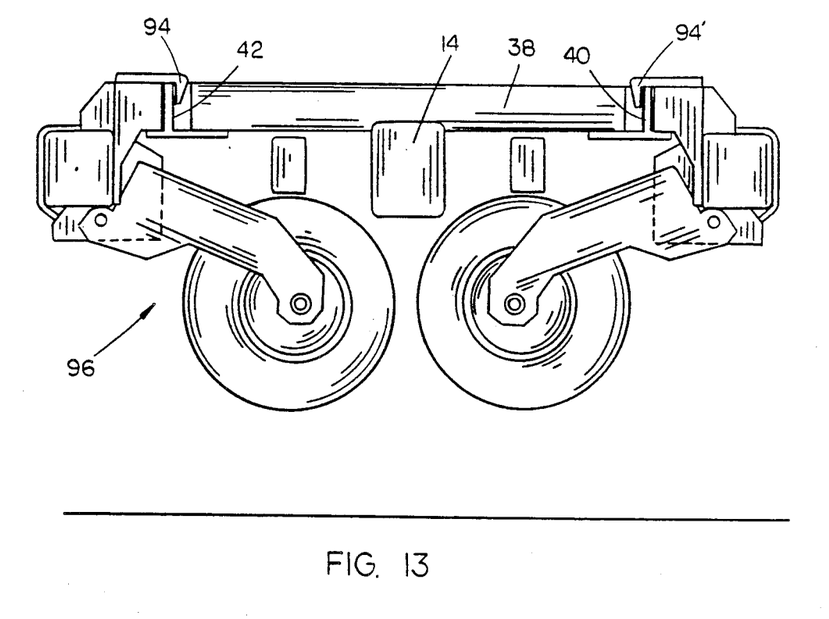
FIG. 13 is a sectional view seen on lines 13—13 of FIG. 2.

Tongue lift assembly 26 includes an elongated frame member 28 which is pivotally connected to tongue section 14 by means of pin means 30 extending through plate P1, frame member 28 and plate P2. Hydraulic cylinder 32 is pivotally connected to and extends between 1 frame member 28 and tongue section 14. Stabilizer bracket 34 is secured to frame member 28 and is received in the underside of tongue section 14 to prevent lateral movement between frame member 28 and tongue section 14. Angle bracket 35 is secured to the upper forward end of stabilizer bracket and is adapted to be selectively positioned between pairs of openings "O" provided in tongue section 14, as will be described in more detail hereinafter. Hitch 36 is provided at the forward end of frame member 28 and is adapted to be secured to a prime mover such as a tractor or the like. Transversely extending transport beam 38 (FIG. 13) is secured to tongue section 14 adjacent the rearward end thereof and has a pair of hook receivers 40 and 42 provided at the opposite ends thereof.

Rearwardly extending locking latch arms 44 and 46 (not shown) are pivotally secured to the rearward end of tongue section 14 by bolts 48 and 50 (not shown) respectively and have locking lug portions 52 and 54 (not shown) provided at the rearward ends thereof. The rearward ends of latch arms 44 and 46 have an inverted U-shaped yoke 56 secured thereto and which extends over the upper end of tongue section 16 to interconnect the latch arms 44 and 46.

Figure 12:
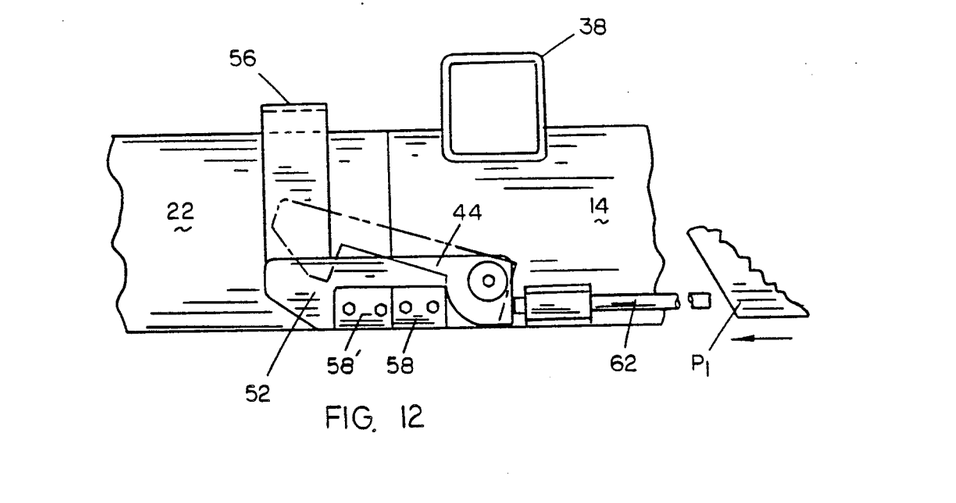
FIG. 12 is a side view of the locking mechanism of FIG. 11.

Stops 58 and 60 are mounted on opposite sides of tongue section 14 and limit the downward pivotal movement of latch arms 44 and 46. Stops 58' and 60' (not shown) are mounted on opposite sides of the forward end of tongue section 22. When the locking latch arms 44 and 46 are in their lowered position and the tongue means is in its transport position, the engagement of lug portions 52 and 54 with the rearward ends of stops 58 and 60' prevents the separation of tongue section 16 from tongue section 14. Movable actuator arm 62 is positioned on one side of tongue section 14 and has its rearward end in close proximity with the lower forward end of latch arm 44 as seen in FIG. 12. The forward end of actuator arm 62 is in close proximity with the rearward end of plate P1 of tongue lift assembly 26 so that when tongue section 14 is raised by hydraulic cylinder 32, relative to frame member 28, plate P1 causes actuator arm 62 to move rearwardly. The rearward movement of actuator arm 62 causes latch arm 44, and latch arm 46, to pivot upwardly so that locking lug portions 52 and 54 are clear of stops 58 and 60, respectively, to permit the extension of the tongue sections relative to one another.

Figure 1:
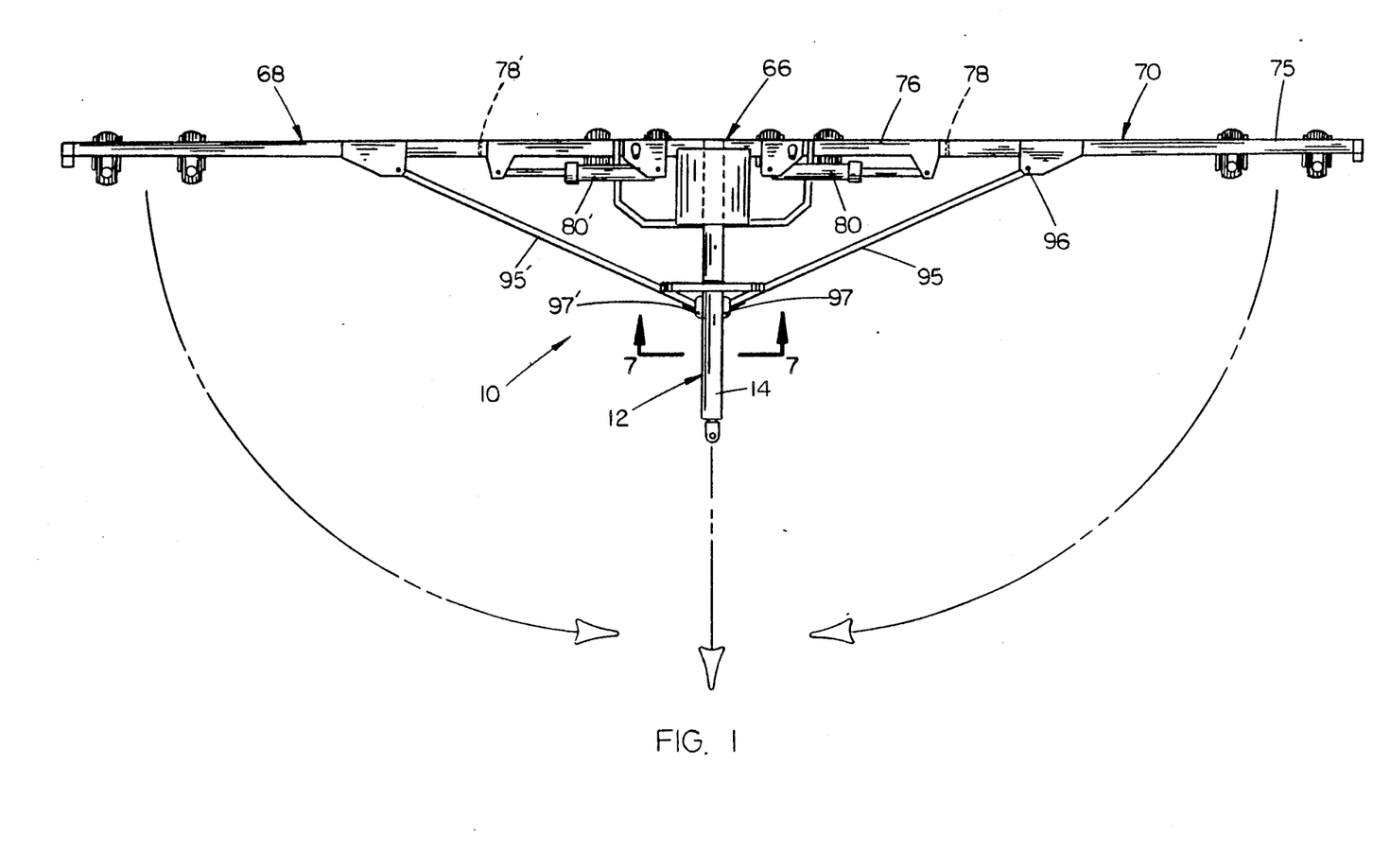
FIG. 1 is a top elevational view of the tool bar of this invention in its field position.
Figure 6:
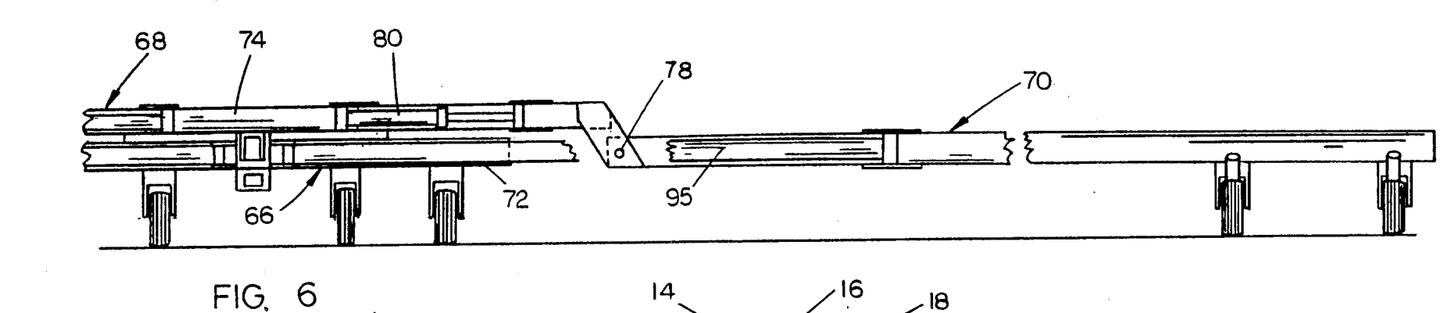
FIG. 6 is a partial front elevational view of the tool bar.
Figure 7:
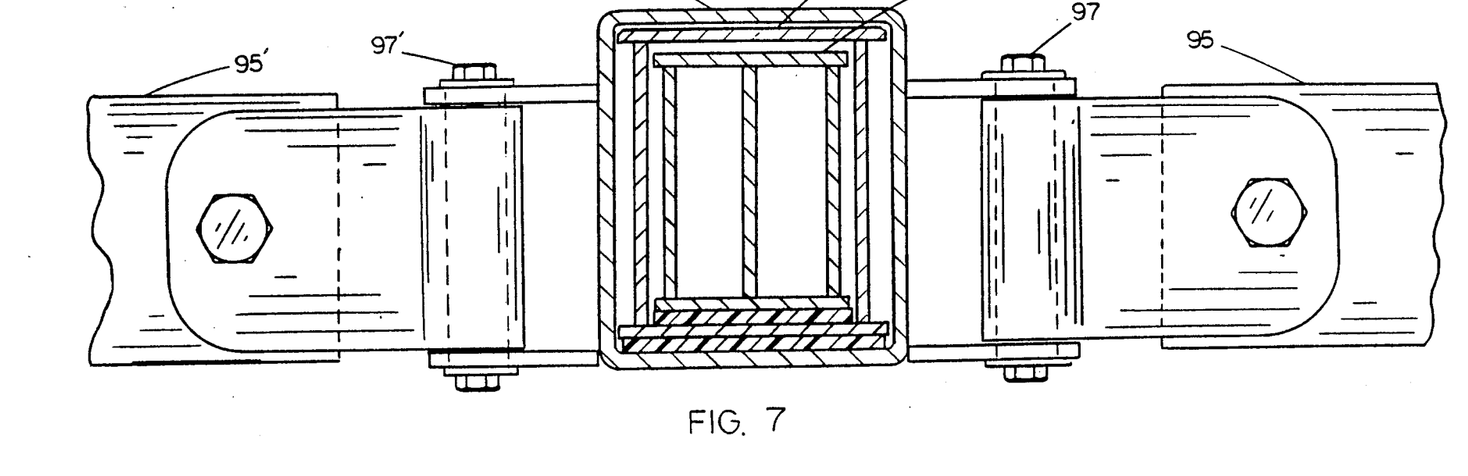
FIG. 7 is a sectional view taken through the tongue.
Figure 8:
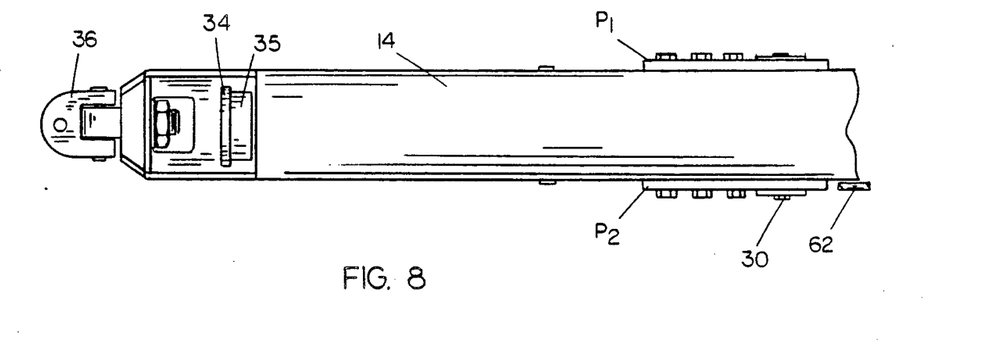
FIG. 8 is a bottom view of the front portion of the tongue.
Figure 9:
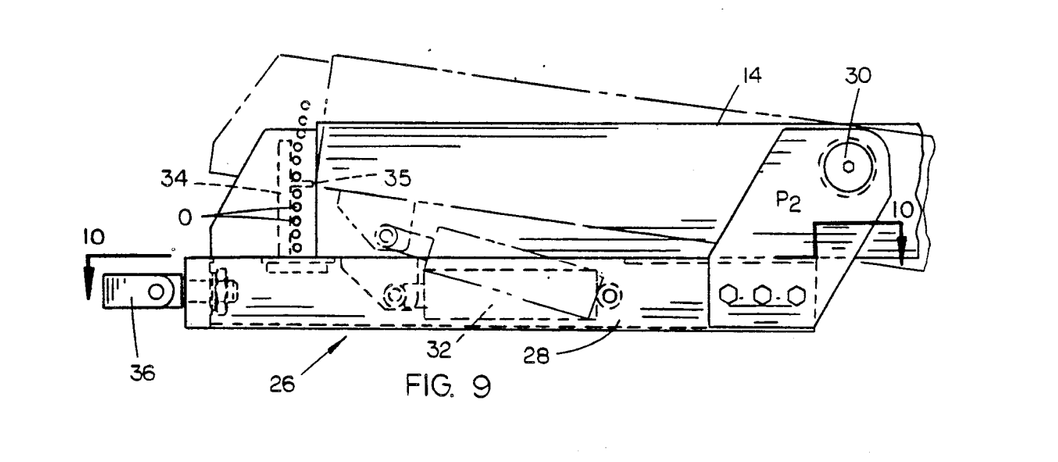
FIG. 9 is a side elevational view of the forward portion of the tongue.
Figure 10:
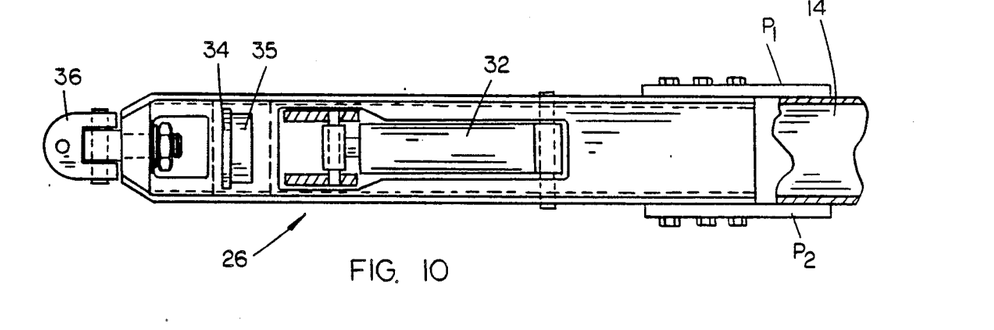
FIG. 10 is a sectional view seen on lines 10—10 of FIG. 9.
Figure 11:
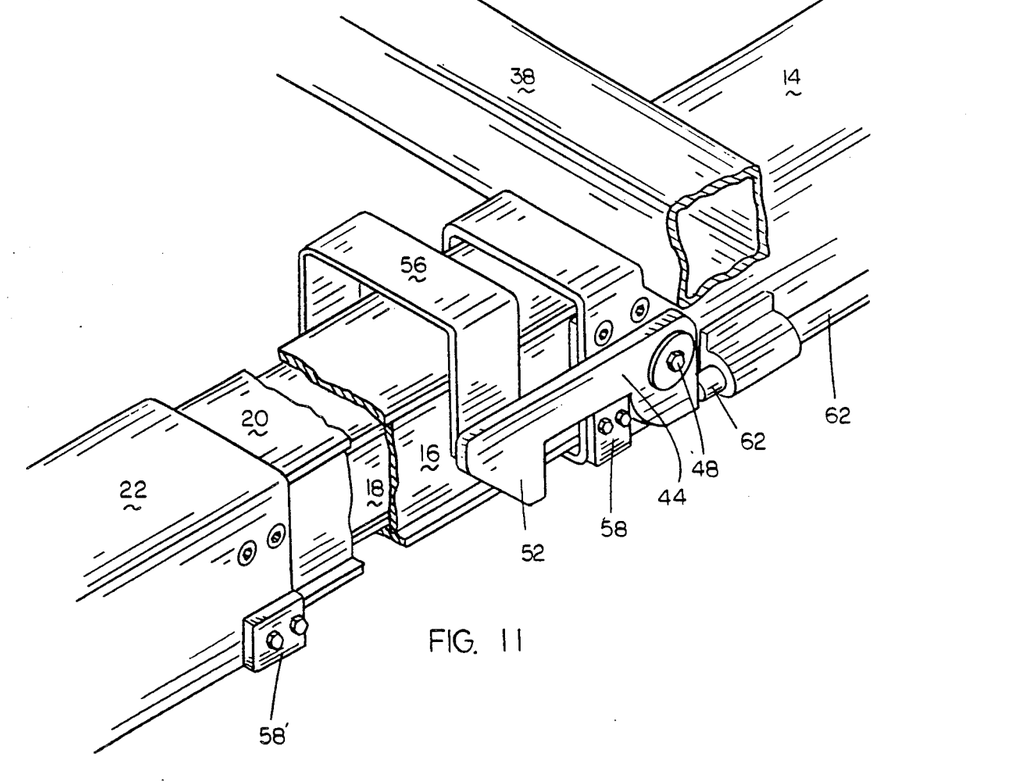
FIG. 11 is a partial perspective view of the means for locking the telescoping tongue members in their withdrawn condition.

Tool bar 10 includes a center tool bar section 66 having wing sections 68 and 70 pivotally connected thereto as seen in the drawings. Center tool bar section 66 includes a lower frame member 72 and an upper frame member 74 secured thereto and positioned thereabove. Wing section 70 includes an outer frame member 75 and an inner frame member 76. Frame member 74 is pivotally connected about a horizontal axis to inner frame member 76 by means of pivot pin 78. Frame member 75 is disposed in a horizontal plane below that of frame member 76 (FIG. 3) but is disposed in the same horizontal plane as lower frame member 72 of center section 66. (FIG. 6) Hydraulic cylinder 80 has its rod 82 pivotally connected to the outer end of frame member 76 at 84. The base end of cylinder 80 is pivotally connected at 86 to plates 88 and 90, which are secured to the outer end of upper frame member 74 and which extend outwardly and forwardly therefrom. Inner frame member 76 is pivotally connected to plate 88 and lower frame member 72 about a pivotal axis referred to generally by the reference numeral 92. Thus, extension of rod 82 from the hydraulic cylinder 80 causes wing section 70 to be moved from the position of FIG. 2 to the position of FIG. 1. Conversely, retraction of rod 82 into the cylinder 80 causes wing section 70 to be pivoted from the solid line position of FIG. 3 to the broken line position of FIG. 3.

The horizontal pivotal connection of outer frame member 75 to the inner frame member 76 at 78 permits frame member 75 to move upwardly and downwardly relative to frame member 76 so as to compensate for irregular terrain such as commonly found in terraces, hill country, etc. Wing section 68 is similarly constructed to wing section 70 and is similarly pivotally secured to center section 66 and therefore will not be described in detail. The outer ends of frame members 75 and 75' are provided with hooks 94 and 94' which are adapted to be received in the hook receiving portions 40 and 42 respective, as will be described in more detail hereinafter.

Brace 95 is pivotally connected, about a vertical axis, at its rearward end to frame member 75 at 96 and is pivotally connected at its forward end, about a vertical axis, to one side of tongue section 14 at 97. Similarly, brace 94' is pivotally connected to frame 75' and tongue section 14 at 97' and extends therebetween.

A plurality of vertically movable gauge wheel assemblies 98 are mounted on frame members 72, 75 and 75' in a spaced apart relationship and in such a manner so that they are substantially positioned forwardly thereof so as not to interfere with the mounting of field attachments thereon such as planters, cultivators, etc.

Figure 15:
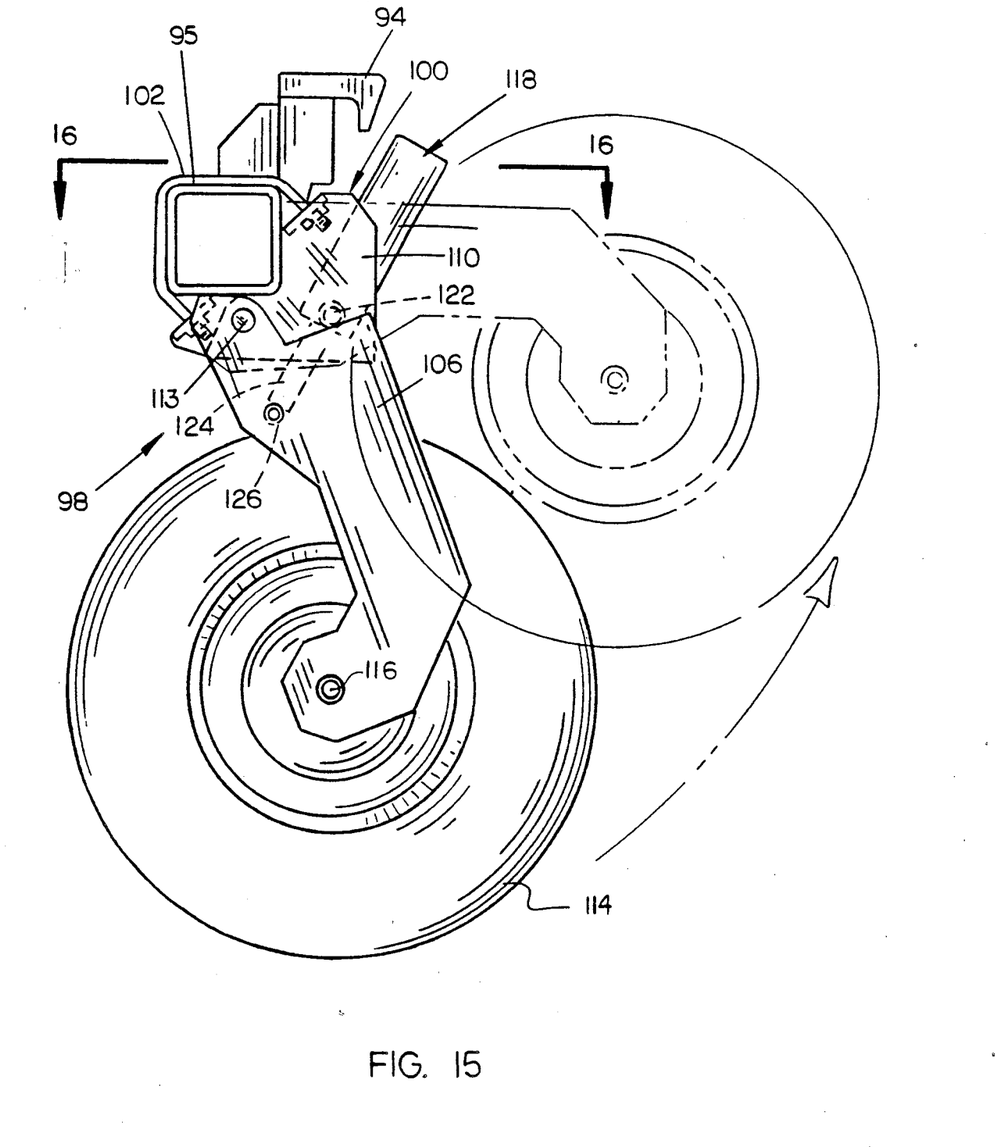
FIG. 15 is a side elevational view illustrating the relationship of one of the gauge wheels with respect to its supporting tool bar with the broken lines illustrating the position to which the gauge wheel may be moved.
Figure 16:
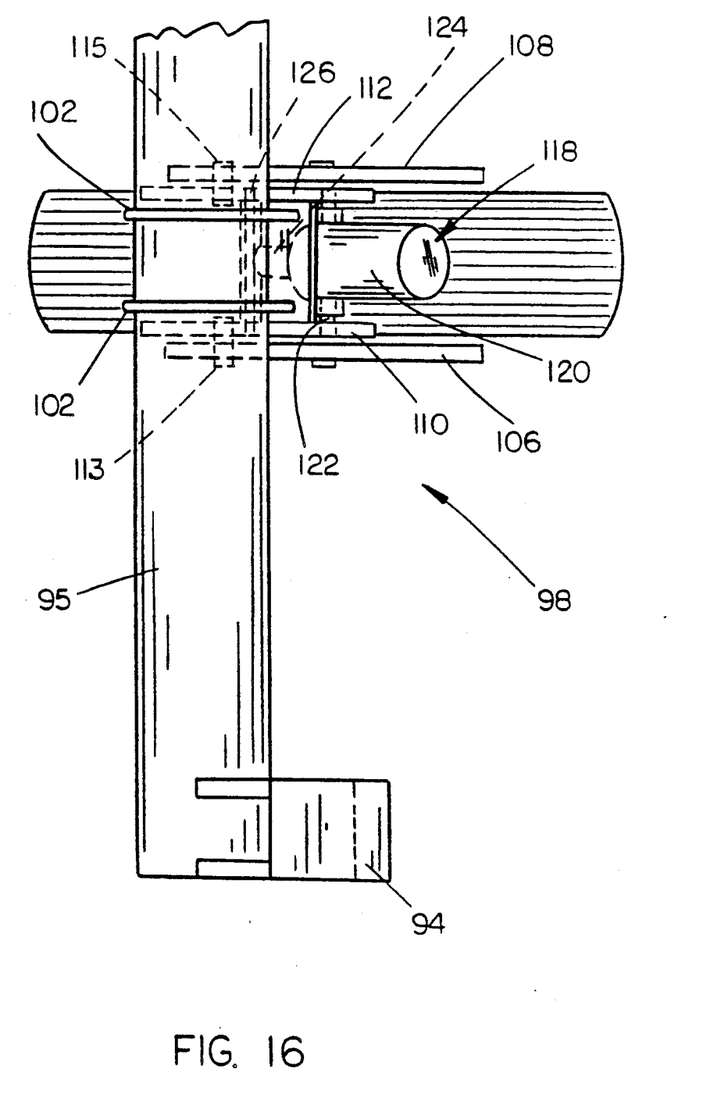
FIG. 16 is a view seen on lines 16—16 of FIG. 15.

Each of the gauge wheel assemblies 98 comprises a clamp mounting bracket 100 which is secured to its respective tool bar frame member at the forward side thereon and at the underside thereof as best illustrated in FIG. 15. Clamp mounting bracket 100 is secured to the frame member by a pair of clamp bolts 102 and 104. A pair of horizontally spaced apart plates or arms 106 and 108 are pivoted to the sides 110 and 112 respectively of clamp mounting bracket 100 by pins 114 and normally extend downwardly and forwardly therefrom as seen in FIG. 15. Wheel 114 is rotatably mounted between the lower ends of plates 106 and 108 by axle assembly 116. Hydraulic cylinder 118 is positioned between sides 110 and 112 and has its body 120 pivotally secured thereto by pin means 122. The lower end of rod 124 of cylinder 118 is pivotally secured to plates 106 and 108 at 126 to enable the wheel 114 to be pivoted between the position illustrated by solid lines in FIG. 15 to the position illustrated by broken lines in FIG. 15.

The normal method of operating the tool bar of this invention is as follows. Assuming that the tool bar of this invention is in the field position of FIG. 1, the wing sections 68 and 70 are permitted to flex about horizontal pivot axis defined by pins 78 and 78' so that the tool bar may compensate for irregular terrain such as experienced in hill country, terraces, etc. The forward mounting of the gauge wheel assemblies 96 on the tool bar sections 72, 75 and 75' insure that the various planter units, etc. may be mounted on the tool bar section without interference from the wheel. The tool bar of this invention may be used for drills or cultivating, or any implement that will clamp to a standard 7 inch by 7 inch bar.

Figure 14:
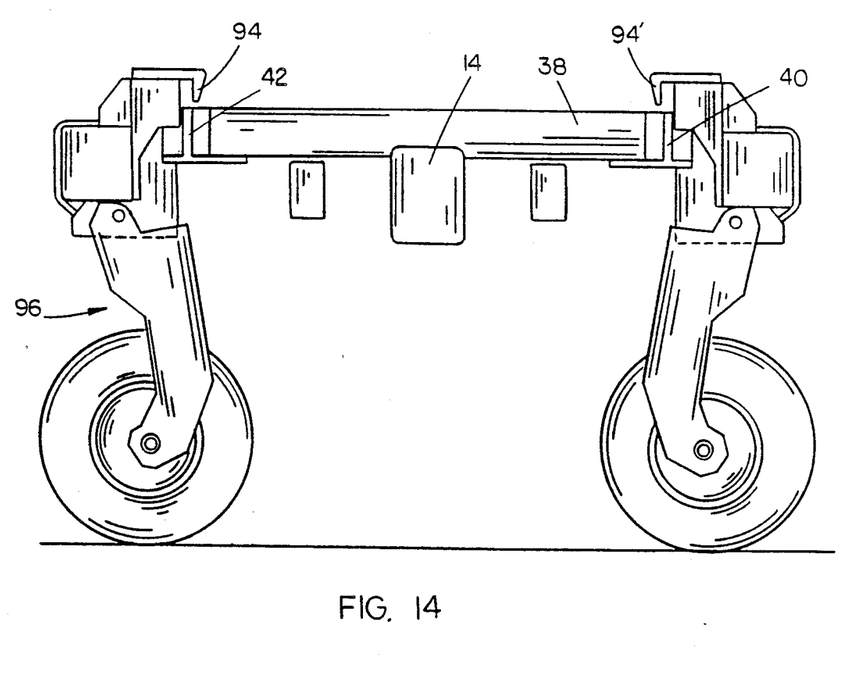
FIG. 14 is a view similar to that of FIG. 13 except that the gauge wheels on the wing sections have been lowered to disconnect the wing sections from the tongue.

When it is desired to fold the tool bar of this invention to the transport position, the hydraulic cylinders 118 on the gauge wheel assemblies 96 are operated to raise the tool bar sections relative to the ground to raise the cultivator unit or the like out of ground engagement. Hydraulic cylinder 32 has been extended to cause the forward end of tongue section 14 to be pivoted with respect to frame member 28 as previously described. Such pivoting causes the lower end of plate P1 to move rearwardly which causes actuator rod 62 to be moved rearwardly which in turn causes the latch arms 44 and 46 to be pivotally moved upwardly so that the tongue sections may be extended relative to one another. Hydraulic cylinders 80 and 80' are then retracted so that wing sections 68 and 70 are pivotally moved from the field position of FIG. 1 to the transport position of FIG. 2. As tool bar section 68 and 70 pivotally move forwardly with respect to tool bar section 66, braces 95 and 95' exert force on tongue section 14 to causes the extension of the various tongue sections with the extension of the tongue sections causing the tractor to roll forwardly. Cylinders 80 and 80' are extended until frame members 75 and 75' are substantially parallel to the tongue of the apparatus and so that the hooks 94 and 94' are positioned over the hook receiving portions 42 and 40 as illustrated in FIG. 14. The hydraulic cylinders for the gauge wheel assemblies on the wing sections 68 and 70 are then retracted which causes wing sections 68 and 70 to be lowered until the hooks 94 and 94' are received in the hook receiving portions 42 and 40. Continued retraction of the hydraulic cylinders on the gauge wheel assemblies on the wing section causes the wheels of those gauge wheel assemblies to be raised out of ground engagement as illustrated in FIG. 3 so that the tool bar will only be supported by the gauge wheel assemblies mounted on tool bar section 66 and so that the gauge wheel assemblies on the tool bar sections 68 and 70 will be out of ground engagement.

Figure 2:
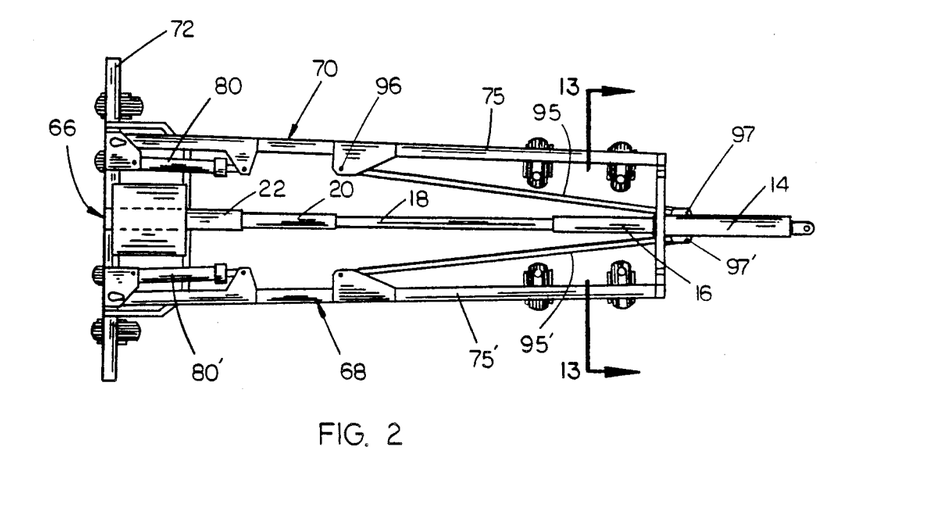
FIG. 2 is a view similar to FIG. 1 except that the wings of the tool bar have been folded to a transport position.
Figure 3:
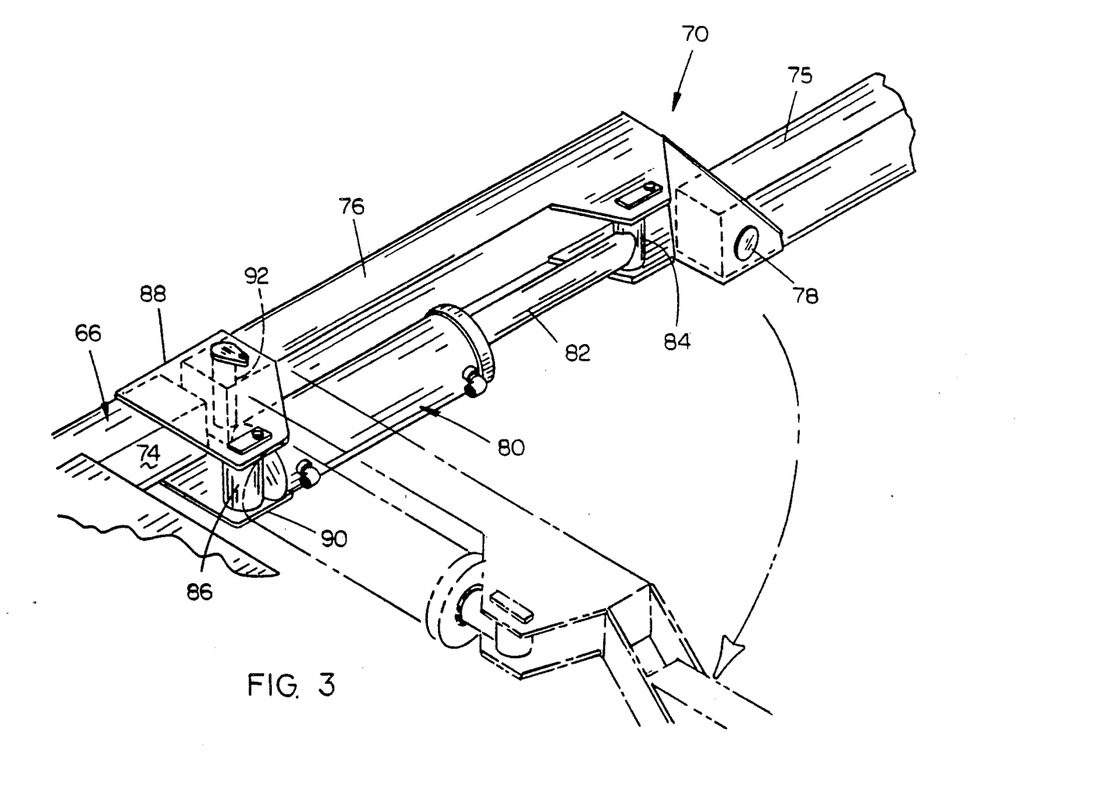
FIG. 3 is a perspective view illustrating the means by which the wings are moved with respect to the center tool bar section.
Figure 4:
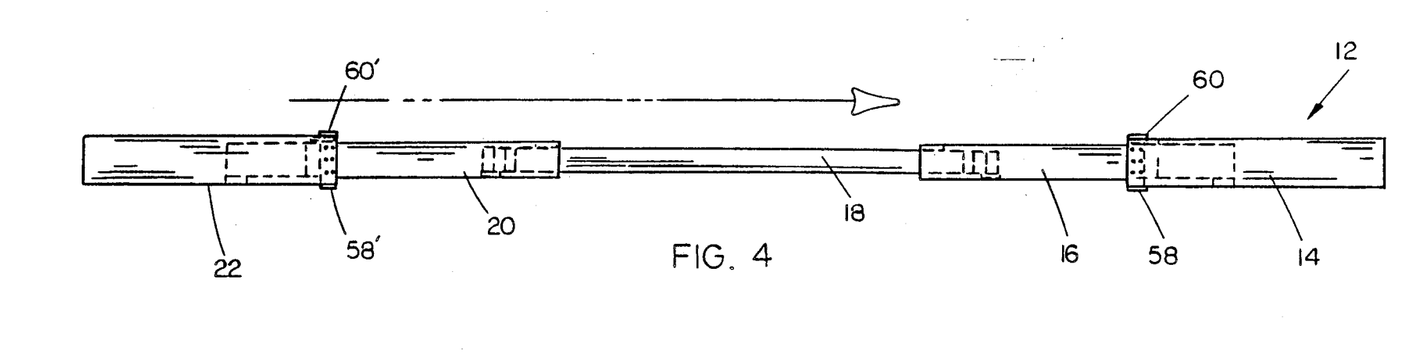
FIG. 4 is a side elevational view of the telescopic tongue of this invention.
Figure 5:
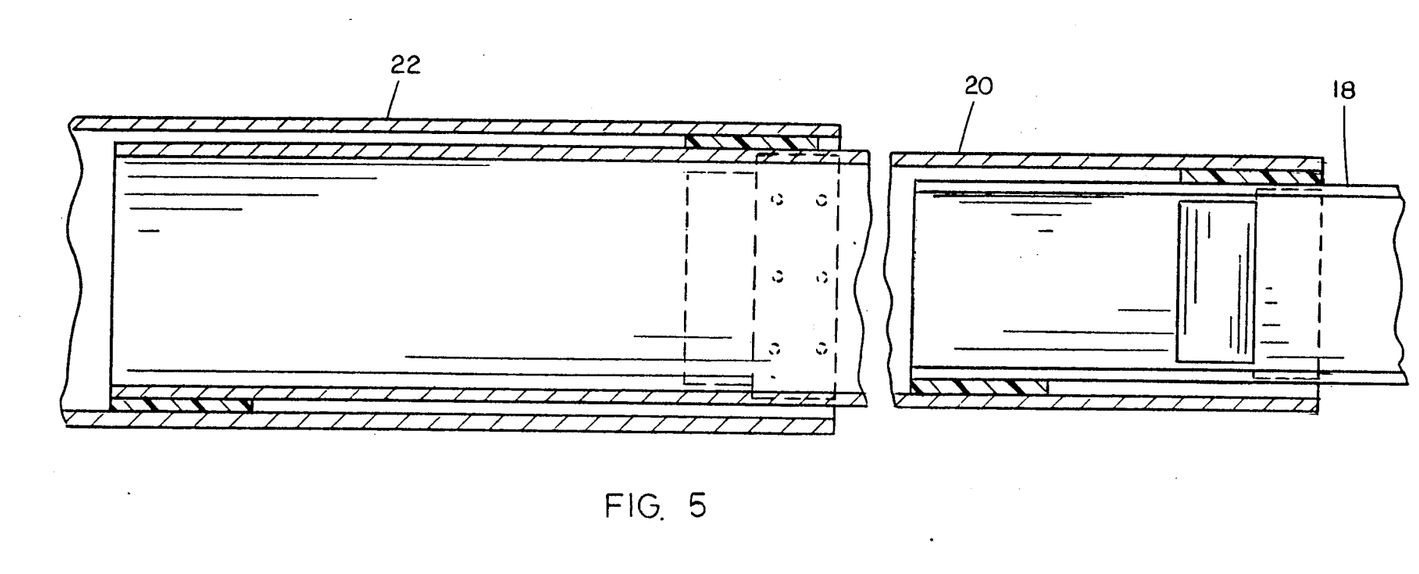
FIG. 5 is a partial sectional view of the tongue of this invention.

When the tool bar is in the transport position of FIG. 2, the tool bar may be easily moved from one location to another. When it is desired to move the tool bar to its field position, the gauge wheel assemblies on the wing sections 68 and 70 are lowered into ground engagement as illustrated in FIG. 14 so that the hooks 94 and 94' disengage from the hook receiving portions 42 and 40. Hydraulic cylinders 80 and 80' are then extended which causes the wing sections 68 and 70 to pivotally move from the position of FIG. 2 to the position of FIG. 1 with the braces 95 and 95, causing the tongue sections to telescope within one another. When the wing sections 68 and 70 are in the position of FIG. 1, the tongue lift assembly cylinder 32 is retracted to permit the actuator rod 62 to move forwardly thereby permitting the latch arms 44 and 46 to move downwardly so that the lug portions 52 and 54 are positioned as illustrated in FIG. 12 to positively maintain the tongue sections in the retracted position.

Thus it can be seen that a novel forwardly folding tool bar has been provided which accomplishes at least all of its stated objectives.

We claim:

1. A forwardly folding tool bar comprising, a center tool bar section disposed transversely to the direction of travel of the tool bar and having opposite ends, an elongated telescoping tongue means operatively secured to said center tool bar section and extending forwardly therefrom for connection to a prime mover, said tongue means being movable from an extended transport position to a retracted field position, said tongue means including a forward tongue member telescopically connected to a rearward tongue member, an elongated frame member pivotally connected at a rearward end to said forward tongue member, and having a forward end projecting forwardly past the forward end of said forward tongue member, a tongue lift means operably connected between said forward tongue member and said elongated frame member, operable to pivot said forward tongue member relative to the elongated frame member from a field position, wherein said elongated frame member and said forward tongue member are generally parallel, to a transport position, wherein the forward end of the forward tongue member is pivoted upwardly away from said elongated frame member, a first wing tool bar section pivotally secured to one end of said center tool bar section and being selectively movable between a field position, wherein said first wing tool bar section is parallel to said center tool bar section, to a transport position, wherein said first wing tool bar section is substantially parallel to said tongue means, a second wing tool bar section pivotally secured to the other end of said center tool bar section and being selectively movable between the field position, wherein said second wing tool bar section is parallel to said center tool bar section, to the transport position, wherein said second wing tool bar section is substantially parallel to said tongue means, at least a first lift wheel assembly selectively pivotally mounted, about a horizontal axis, on said first wing tool bar section, at least a second lift wheel assembly pivotally mounted, about a horizontal axis on said second wing tool bar section, at least a pair of spaced apart third lift wheel assemblies pivotally mounted, about horizontally axes, on said center tool bar section, means for selectively pivoting said first and second lift wheel assemblies relative to said wing tool bar sections, means for selectively pivotally moving said third lift wheel assemblies relative to said center tool bar section, means for securing the outer ends of said wing tool bar sections to said tongue means when said wing tool bar sections have been folded to the transport positions, said lift wheel assemblies being mounted forwardly of their respective tool bar sections, lock means for selectively maintaining said tongue means in its retracted position, said lock means including at least one hook member pivotally secured to said forward tongue member and movable between locked and unlocked positions, and receptacle means on said rearward tongue member which receives said hook member when said hook member is in its locked position, and actuator means mounted on said forward tongue member rearwardly of the pivotal connection of the forward tongue member with said elongated frame member and between said elongated frame member and said at least one hook member, said actuator means operable to pivot said hook member from the locked position to the unlocked position upon movement of the elongated frame member relative to said forward tongue member.

2. The tool bar of claim 1 wherein each of said lift wheel assemblies comprise a mounting bracket secured to and positioned forwardly of an associated tool bar section, a wheel support pivotally secured, about a horizontal axis, to said mounting bracket and normally extending downwardly and forwardly therefrom, a wheel rotatably mounted at the lower end of said wheel support, a hydraulic cylinder pivotally connected to and extending between said mounting bracket and said wheel support for pivotally moving said wheel with respect to the associated tool bar.

3. The tool bar of claim 1 wherein said means for securing the outer ends of said tool bar sections to said tongue means comprises a transversely extending cross frame having its outer end positioned laterally of said tongue means, a hook receiving means at each end of said cross frame, and a hook secured to each of said wing tool bar sections which is for reception of one of the hook receiving means.

4. The tool bar of claim 1 wherein said tongue means includes at least a hollow forward tongue member having rearward and forward ends, at least a hollow rear tongue member having rearward and forward ends, and at least a center tongue member having forward and rearward ends, the forward end of said center tongue member being slidably received within the rearward end of said forward tongue member, the rearward end of said center tongue member being slidably received by the forward end of said rearward tongue member, the rearward end of said forward tongue member being closely positioned to the forward end of said rearward tongue member when said tongue means is in its retracted position.

5. The tool bar of claim 4 including means for remotely actuating said lock means.

6. The tool bar of claim 1 wherein each of said wing tool bar sections are also pivotally movable, about a horizontal axis, with respect to said center tool bar section.

7. The tool bar of claim 1, wherein said actuator means includes a slidable elongated arm, said arm positioned with a forward end adjacent a portion of said elongated frame member and a rearward end adjacent a portion of said hook member such that pivotal movement of the elongated frame member from the transport position to the field position will slide arm rearwardly to pivot said hook member.

* * * * *